United States Patent
Luo et al.

(10) Patent No.: US 12,452,789 B2
(45) Date of Patent: Oct. 21, 2025

(54) CHANNEL MONITORING AND CONTROL METHOD AND APPARATUS THEREOF

(71) Applicant: DATANG MOBILE COMMUNICATIONS EQUIPMENT CO., LTD., Beijing (CN)

(72) Inventors: Chen Luo, Beijing (CN); Jiaqing Wang, Beijing (CN); Meiying Yang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 336 days.

(21) Appl. No.: 17/801,264

(22) PCT Filed: Dec. 22, 2020

(86) PCT No.: PCT/CN2020/138416
§ 371 (c)(1),
(2) Date: Aug. 22, 2022

(87) PCT Pub. No.: WO2021/164409
PCT Pub. Date: Aug. 26, 2021

(65) Prior Publication Data
US 2023/0022171 A1    Jan. 26, 2023

(30) Foreign Application Priority Data

Feb. 21, 2020  (CN) .......... 202010108436.8

(51) Int. Cl.
*H04W 52/02* (2009.01)
*H04L 5/00* (2006.01)
*H04W 76/28* (2018.01)

(52) U.S. Cl.
CPC ....... *H04W 52/0248* (2013.01); *H04W 76/28* (2018.02); *H04L 5/0053* (2013.01)

(58) Field of Classification Search
CPC . H04W 52/0248; H04W 76/28; H04W 76/25; H04W 52/0216; H04W 52/0235;
(Continued)

(56) References Cited

U.S. PATENT DOCUMENTS

2019/0158205 A1    5/2019   Sheng et al.
2019/0268965 A1*   8/2019   Jiang et al. ........... H04W 76/28
(Continued)

FOREIGN PATENT DOCUMENTS

CN    101784081 A    7/2010
CN    109963326 A    7/2019
(Continued)

OTHER PUBLICATIONS (CN 110830198 A) >>> A Transmission Method and Device for Control Information (se title) (Year: 2020).*
(Continued)

*Primary Examiner* — San Htun
(74) *Attorney, Agent, or Firm* — KILPATRICK TOWNSEND & STOCKTON LLP (57) ABSTRACT

Disclosed are channel monitoring and a control method and apparatus thereof. The channel monitoring control method provided in the present application includes determining PDCCH monitoring solution instruction information; and sending the PDCCH monitoring solution instruction information to the terminal for instructing the terminal to adjust the PDCCH monitoring solution.

12 Claims, 3 Drawing Sheets

(58) Field of Classification Search
CPC ......... H04W 52/0219; H04W 52/0229; H04W 52/028; H04W 52/0212; H04W 48/12; H04W 48/10; H04W 72/00; H04W 72/20; H04W 72/23; H04W 72/231; H04W 72/232; H04W 76/00; H04W 76/27; H04W 24/00; H04W 24/02; H04W 24/10; H04B 17/30; Y02D 30/70; H04L 5/00; H04L 5/02

See application file for complete search history.

(56) References Cited

U.S. PATENT DOCUMENTS

| | | | | |
|---|---|---|---|---|
| 2019/0363843 | A1* | 11/2019 | Gordaychik | H04L 1/1896 |
| 2020/0052857 | A1* | 2/2020 | Hu et al. | H04L 5/0053 |
| 2020/0053670 | A1* | 2/2020 | Jung et al. | H04W 56/00 |
| 2020/0092073 | A1* | 3/2020 | Papasakellariou et al. | H04L 5/0094 |
| 2020/0229098 | A1* | 7/2020 | Cheng et al. | H04W 52/0248 |
| 2020/0337077 | A1* | 10/2020 | Yoshimura | H04L 1/1864 |
| 2021/0007101 | A1* | 1/2021 | Tooher | H04W 72/0446 |
| 2021/0385677 | A1* | 12/2021 | Yang et al. | H04W 24/08 |
| 2022/0132474 | A1* | 4/2022 | Sasaki | H04W 72/042 |
| 2022/0295558 | A1* | 9/2022 | Lei et al. | H04W 74/0816 |
| 2022/0312463 | A1* | 9/2022 | Niu et al. | H04W 72/1289 |

FOREIGN PATENT DOCUMENTS

| | | |
|---|---|---|
| CN | 110381569 A | 10/2019 |
| CN | 110740025 A | 1/2020 |
| CN | 111757498 A | 10/2020 |
| CN | 111867021 A | 10/2020 |
| WO | 2018137672 A1 | 8/2018 |
| WO | 2019184696 A1 | 10/2019 |
| WO | 2019196664 A1 | 10/2019 |

OTHER PUBLICATIONS (WO 2020258157 A1) >>> Resource Set Monitoring Method, Device and Storage Medium (see title) (Year: 2020).*
(CN 111867021 A) >>> Monitoring Method, Device and Device of Physical Downlink Control Channel (see title) (Year: 2020).*
(CN 110679189 A) >>> Method of Receiving Downlink Channel in a Wireless Communication System and Device Thereof (see title) (Year: 2020).*
(WO 2019051707 A1), Lin, Yanan: the terminal device can accurately detect the monitoring PDCCH by using the time domain location of the first CORESET configured by the network device and the CORESET distribution period in a certain time slot (Description, first paragraph) (Year: 2019).*
Huawei et al., "Signaling based mechanisms for UE power saving", 3GPP TSG RAN WG1 Meeting #94bis, Chengdu, China, Oct. 8-12, 2018, total 7 pages, R1-1810155.
Vivo, "Discussion on UE adaptation to the traffic and UE power consumption characteristics", 3GPP TSG RAN WG1 #19AH1, Taipei, Jan. 21-25, 2019, total 7 pages, R1-1900145.
Catt, "PDCCH skipping and switching of PDCCH monitoring periodicity", 3GPP TSG RAN WG1 Meeting #97, Reno, USA, May 13-17, 2019, total 6 pages, R1-1906353.
Samsung,"On PDCCH-based power saving signal/channel", 3GPP TSG RAN WG1 RAN1 Meeting #96bis , Xi'an, China, Apr. 8-12, 2019, total 7 pages, R1-1904461.

* cited by examiner

Fig. 1

--Prior Art--

CHANNEL MONITORING AND CONTROL METHOD AND APPARATUS THEREOF

CROSS REFERENCE TO RELATED APPLICATIONS

The present application is a US National Stage of International Application No. PCT/CN2020/138416, filed on Dec. 22, 2020, which claims priority to the Chinese Patent Application No. 202010108436.8, filed to the China Patent Office on Feb. 21, 2020 and entitled "CHANNEL MONITORING AND CONTROL METHOD AND APPARATUS THEREOF", the entire contents of which are incorporated herein by reference.

FIELD

The present application relates to the field of communications, in particular to channel monitoring and control methods and apparatuses thereof.

BACKGROUND

Physical downlink control channel (PDCCH) monitoring: a base station may allocate one or more search spaces to a user via a system message. The configuration of each search space is periodic, and the user performs PDCCH detection in the configured search space. The moment when the user performs PDCCH detection each time is called a PDCCH monitoring occasion. The search space is generally configured periodically. In the 5G new radio (NR) system, in order to obtain downlink scheduling information, a user equipment (UE) needs to monitor a PDCCH at every PDCCH monitoring occasion to determine whether there is downlink scheduling information. Each PDCCH monitoring process is a PDCCH decoding process, and then according to a check result of a cyclic redundancy check (CRC), it is determined as downlink control information (DCI) carrying UE scheduling information. If the PDCCH has scheduling information of the user, the UE can obtain a positive CRC value, and at the same time, can obtain the scheduling information carried in the DCI; otherwise, a CRC value is negative, and the UE cannot obtain any information in the DCI.

The parameter configuration of a PDCCH is as follows:
- an index of a search space set, namely, a search space ID;
- the serial number of a control resource set configured to establish the relationship between a search space s and the control resource set p, namely, a CORESET ID;
- a PDCCH monitoring cycle $k_{p,s}$ and an offset value $o_{p,s}$ which are in the unit of slot, where a terminal determines a slot for monitoring a downlink control channel according to the configuration parameter;
- an indication of monitoring the duration of consecutive slots where a search space of the PDCCH is located;
- a monitoring pattern of the PDCCH in the slots;
- the quantity $M_{p,s}^{(L)}$ of PDCCH candidates included in each aggregation level in the search space, where supportable aggregation levels include {1, 2, 4, 8, 16}, and are configured via independent parameters; and
- a sign searchspaceType configured to distinguish whether the current search space is a common search space or a terminal-specific search space.

Figure 1:
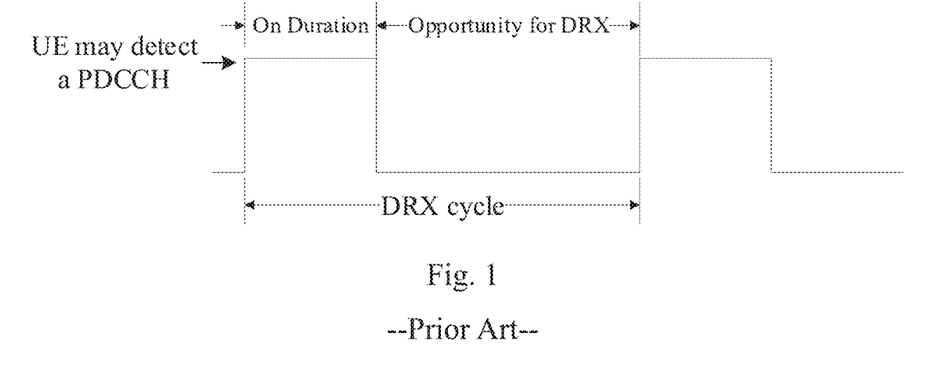
FIG. 1 is a schematic diagram of a DRX cycle.

Discontinuous reception (DRX) transmission: as shown in FIG. 1, when the UE is configured with DRX, the UE may discontinuously monitor the PDCCH. The UE performs PDCCH monitoring only during the DRX on duration or when an inactivity timer does not expire.

A DRX mechanism is as shown in FIG. 1. In a DRX cycle, the UE only monitors the PDCCH during an On duration cycle. In an "Opportunity for DRX", that is, during DRX off, the UE does not receive other PDCCHs except for scheduling broadcast signaling to reduce power consumption, namely, entering a sleep mode.

An indication of a dormancy behavior of a secondary cell (SCell): according to the standardized conclusion of NR R15, for a DRX active time, introduced DCI format 2_6 may be configured to indicate the dormancy condition of the SCell, with a maximum of 5 bits. Specifically, a CRC of DCI format 2_6 is scrambled by power saving-radio network temporary identifier (PS-RNTI), and the format is as follows: {data block 1, data block 2, . . . , data block N}.

Each data block includes: 1 bit of wake-up indication and 0-5 bits of SCell dormancy indication. The quantity of bits of the SCell dormancy indication is bitmap of an SCell group outside the active time. For different bits, "0" indicates that the corresponding SCell group is in or switched to a dormancy band width part (BWP), and "1" indicates that the corresponding SCell group is in or switched to a non-dormancy BWP. The dormancy BWP is not configured with a search set parameter of the PDCCH, that is, when the SCell is switched to the dormancy BWP, there is no need to perform PDCCH monitoring, namely, being in a dormancy state.

For the DRX active time, SCell dormancy indications are also added in DCI format 1_1 and DCI format 1_0, and are similar as the SCell dormancy indication in DCI format 2_6 in the DRX inactive time.

Adjustment of PDCCH monitoring parameters is achieved via BWP switch.

In the prior art, PDCCH monitoring information may also be changed via BWP switch. The base station configures two BWPs for the UE: BWP1 is configured with a regular parameter configuration 1 of the PDCCH search space, and BWP2 is configured with an optional parameter configuration 2 of the PDCCH search space. When the base station needs the UE to adjust the PDCCH monitoring, the base station triggers the UE to perform BWP switch to switch to BWP2. When the base station needs to resume regular PDCCH monitoring, the base station may trigger the UE to perform BWP switch to switch back to BWP1.

However, a current PDCCH monitoring scheme has the following disadvantages.

PDCCH monitoring information is semi-statically configured and has a low flexibility. When the base station configures PDCCH monitoring time for the UE via higher layer signaling, an RRC reconfiguration delay is relatively long.

The terminal needs to perform PDCCH decoding and reception on all configured PDCCH monitoring occasions, so there may be an unnecessary decoding process when there is no data service transmission.

The PDCCH monitoring configuration information does not match channel state information, and the semi-statically configured PDCCH monitoring information is not updated in time.

The delay of BWP switch may be prolonged as the PDCCH monitoring information is changed simply relying on BWP switch. If the scheme is used for adaptive adjustment, user data transmission may be affected due to untimely adjustment.

Although an SCell dormancy indication is added in DCI of R15, the SCell dormancy indication only indicates whether the SCell monitors the PDCCH, and cannot dynamically perform adaptive adjustment of PDCCH monitoring of the SCell, resulting in poor flexibility.

SUMMARY

Embodiments of the present application provide channel monitoring and control methods and apparatuses thereof, for achieving an adaptive PDCCH monitoring scheme, achieving adaptive adjustment of PDCCH monitoring according to a service condition of a terminal, and achieving an effect of power saving of the terminal.

On a network side, a channel monitoring control method provided by an embodiment of the present application includes:

determining PDCCH monitoring scheme indication information; and sending the PDCCH monitoring scheme indication information to a terminal for indicating the terminal to adjust a PDCCH monitoring scheme.

According to the embodiment of the present application, by determining the PDCCH monitoring scheme indication information, and sending the PDCCH monitoring scheme indication information to the terminal for indicating the terminal to adjust the PDCCH monitoring scheme, the adaptive PDCCH monitoring scheme is achieved, adaptive adjustment of PDCCH monitoring according to the service condition of the terminal is achieved, and the effect of power saving of the terminal is achieved.

In one embodiment, the PDCCH monitoring scheme indication information includes indication information of one or a combination of the following functions:

function 1: an indication of whether to skip the next or subsequent PDCCH monitoring occasions.

function 2: a PDCCH monitoring adaptive indication of an SCell, configured to indicate the SCell or an SCell group to adjust the PDCCH monitoring scheme;

function 3: an indication of a cycle of the PDCCH monitoring occasion;

function 4: an indication of a CORESET where the PDCCH monitoring occasion is located;

function 5: an indication of a monitoring pattern of the PDCCH monitoring occasion;

function 6: an indication of a PDCCH monitoring aggregation level and/or the quantity of PDCCH candidates per PDCCH monitoring occasion aggregation level; and function 7: an indication of monitoring a duration of consecutive slots where a PDCCH search space is located.

In one embodiment, the sending the PDCCH monitoring scheme indication information to the terminal includes:

sending the PDCCH monitoring scheme indication information to the terminal via a DCI format and/or a medium access control control element (MAC CE).

In one embodiment, the DCI format is DCI format 1_1 or DCI format 1_0 or DCI format 2_6.

In one embodiment, the sending the PDCCH monitoring scheme indication information to the terminal includes:

sending the PDCCH monitoring scheme indication information to one or more terminals.

In one embodiment, the sending the PDCCH monitoring scheme indication information to the terminal includes:

sending the PDCCH monitoring scheme indication information to the terminal in an explicit manner or an implicit manner.

On a terminal side, a channel monitoring method provided by an embodiment of the present application includes:

receiving PDCCH monitoring scheme indication information sent by a network side; and adjusting a PDCCH monitoring scheme according to the PDCCH monitoring scheme indication information.

In one embodiment, the PDCCH monitoring scheme indication information includes indication information of one or a combination of the following functions:

function 1: an indication of whether to skip the next or subsequent PDCCH monitoring occasions.

function 2: a PDCCH monitoring adaptive indication of an SCell, configured to indicate the SCell or an SCell group to adjust the PDCCH monitoring scheme;

function 3: an indication of a cycle of the PDCCH monitoring occasion;

function 4: an indication of a CORESET where the PDCCH monitoring occasion is located;

function 5: an indication of a monitoring pattern of the PDCCH monitoring occasion;

function 6: an indication of a PDCCH monitoring aggregation level and/or the quantity of PDCCH candidates per PDCCH monitoring occasion aggregation level; and function 7: an indication of monitoring a duration of consecutive slots where a PDCCH search space is located.

In one embodiment, the receiving the PDCCH monitoring scheme indication information sent by the network side includes:

receiving the PDCCH monitoring scheme indication information via a DCI format and/or an MAC CE.

In one embodiment, the DCI format is DCI format 1_1 or DCI format 1_0 or DCI format 2_6.

In one embodiment, the receiving the PDCCH monitoring scheme indication information sent by the network side includes:

receiving the PDCCH monitoring scheme indication information in an explicit manner or an implicit manner.

On a network side, an apparatus for controlling channel monitoring provided by an embodiment of the present application includes:

a memory, configured to store program instructions; and a processor, configured to call the program instructions stored in the memory, and execute according to an obtained program:

determining PDCCH monitoring scheme indication information; and sending the PDCCH monitoring scheme indication information to a terminal for indicating the terminal to adjust a PDCCH monitoring scheme.

In one embodiment, the PDCCH monitoring scheme indication information includes indication information of one or a combination of the following functions:

function 1: an indication of whether to skip the next or subsequent PDCCH monitoring occasions.

function 2: a PDCCH monitoring adaptive indication of an SCell, configured to indicate the SCell or an SCell group to adjust a PDCCH monitoring scheme;

function 3: an indication of a cycle of the PDCCH monitoring occasion;

function 4: an indication of a CORESET where the PDCCH monitoring occasion is located;

function 5: an indication of a monitoring pattern of the PDCCH monitoring occasion;

function 6: an indication of a PDCCH monitoring aggregation level and/or the quantity of PDCCH candidates per PDCCH monitoring occasion aggregation level; and function 7: an indication of monitoring a duration of consecutive slots where a PDCCH search space is located.

In one embodiment, the processor is configured to:
send the PDCCH monitoring scheme indication information to the terminal via a DCI format and/or an MAC CE.

In one embodiment, the DCI format is DCI format 1_1 or DCI format 1_0 or DCI format 2_6.

In one embodiment, the processor is configured to:
send the PDCCH monitoring scheme indication information to one or more terminals.

In one embodiment, the processor is configured to:
send the PDCCH monitoring scheme indication information to the terminal in an explicit manner or an implicit manner.

On a terminal side, a channel monitoring apparatus provided by an embodiment of the present application includes:
a memory, configured to store program instructions; and
a processor, configured to call the program instructions stored in the memory, and execute according to an obtained program:
receiving PDCCH monitoring scheme indication information sent by a network side; and
adjusting a PDCCH monitoring scheme according to the PDCCH monitoring scheme indication information.

In one embodiment, the PDCCH monitoring scheme indication information includes indication information of one or a combination of the following functions:
function 1: an indication of whether to skip the next or subsequent PDCCH monitoring occasions.
function 2: a PDCCH monitoring adaptive indication of an SCell, configured to indicate the SCell or an SCell group to adjust the PDCCH monitoring scheme;
function 3: an indication of a cycle of the PDCCH monitoring occasion;
function 4: an indication of a CORESET where the PDCCH monitoring occasion is located;
function 5: an indication of a monitoring pattern of the PDCCH monitoring occasion;
function 6: an indication of a PDCCH monitoring aggregation level and/or the quantity of PDCCH candidates per PDCCH monitoring occasion aggregation level; and
function 7: an indication of monitoring a duration of consecutive slots where a PDCCH search space is located.

In one embodiment, the processor is configured to:
receive the PDCCH monitoring scheme indication information via a DCI format and/or an MAC CE.

In one embodiment, the DCI format is DCI format 1_1 or DCI format 1_0 or DCI format 2_6.

In one embodiment, the processor is configured to:
receive the PDCCH monitoring scheme indication information in an explicit manner or an implicit manner.

On a network side, another apparatus for controlling channel monitoring provided by an embodiment of the present application includes:
a determining unit, configured to determine PDCCH monitoring scheme indication information; and
a sending unit, configured to send the PDCCH monitoring scheme indication information to a terminal for indicating the terminal to adjust a PDCCH monitoring scheme.

In one embodiment, the PDCCH monitoring scheme indication information includes indication information of one or a combination of the following functions:
function 1: an indication of whether to skip the next or subsequent PDCCH monitoring occasions.
function 2: a PDCCH monitoring adaptive indication of an SCell, configured to indicate the SCell or an SCell group to adjust the PDCCH monitoring scheme;
function 3: an indication of a cycle of the PDCCH monitoring occasion;
function 4: an indication of a CORESET where the PDCCH monitoring occasion is located;
function 5: an indication of a monitoring pattern of the PDCCH monitoring occasion;
function 6: an indication of a PDCCH monitoring aggregation level and/or the quantity of PDCCH candidates per PDCCH monitoring occasion aggregation level; and
function 7: an indication of monitoring a duration of consecutive slots where a PDCCH search space is located.

In one embodiment, the sending unit is configured to:
send the PDCCH monitoring scheme indication information to the terminal via a DCI format and/or an MAC CE.

In one embodiment, the DCI format is DCI format 1_1 or DCI format 1_0 or DCI format 2_6.

In one embodiment, the sending unit is configured to:
send the PDCCH monitoring scheme indication information to one or more terminals.

In one embodiment, the sending unit is configured to:
send the PDCCH monitoring scheme indication information to the terminal in an explicit manner or an implicit manner.

On a terminal side, another channel monitoring apparatus provided by an embodiment of the present application includes:
a receiving unit, configured to receive PDCCH monitoring scheme indication information sent by a network side; and
an adjusting unit, configured to adjust a PDCCH monitoring scheme according to the PDCCH monitoring scheme indication information.

In one embodiment, the PDCCH monitoring scheme indication information includes indication information of one or a combination of the following functions:
function 1: an indication of whether to skip the next or subsequent PDCCH monitoring occasions.
function 2: a PDCCH monitoring adaptive indication of an SCell, configured to indicate the SCell or an SCell group to adjust the PDCCH monitoring scheme;
function 3: an indication of a cycle of the PDCCH monitoring occasion;
function 4: an indication of a CORESET where the PDCCH monitoring occasion is located;
function 5: an indication of a monitoring pattern of the PDCCH monitoring occasion;
function 6: an indication of a PDCCH monitoring aggregation level and/or the quantity of PDCCH candidates per PDCCH monitoring occasion aggregation level; and function 7: an indication of monitoring a duration of consecutive slots where a PDCCH search space is located.

In one embodiment, the receiving unit is configured to: receive the PDCCH monitoring scheme indication information via a DCI format and/or an MAC CE.

In one embodiment, the DCI format is DCI format 1_1 or DCI format 1_0 or DCI format 2_6.

In one embodiment, the receiving unit is configured to: receive the PDCCH monitoring scheme indication information in an explicit manner or an implicit manner.

Another embodiment of the present application provides a computing device, including a memory and a processor, and the memory is configured to store program instructions; and the processor is configured to call the program instructions stored in the memory, and execute any one of the above channel monitoring methods according to an obtained program.

Another embodiment of the present application provides a computer storage medium storing computer-executable instructions. The computer-executable instructions are configured to enable a computer to execute any one of the above channel monitoring methods.

BRIEF DESCRIPTION OF THE DRAWINGS

In order to explain the embodiments of the present application more clearly, the accompanying drawings that need to be used in the description of the embodiments will be briefly introduced below. It is apparent that the accompanying drawings in the following description are only some embodiments of the present application, and other accompanying drawings may be obtained based on these accompanying drawings without any creative effort.

DETAILED DESCRIPTION OF THE EMBODIMENTS

The embodiments of the present application will be clearly and completely described below with reference to the accompanying drawings in the embodiments of the present application. It is apparent that the described embodiments are only a part of the embodiments of the present application, rather than all of the embodiments.

The embodiments of the present application provide channel monitoring and control methods and apparatuses thereof, for achieving an adaptive physical downlink control channel (PDCCH) monitoring scheme, to achieve adaptive adjustment of PDCCH monitoring according to a service condition of a terminal, and achieve an effect of power saving of the terminal.

The method and the apparatus are based on the same application concept. Since the principles of the method and the apparatus for solving the problem are similar, the implementations of the apparatus and the method may be referred to each other, and repeated descriptions will not be repeated here.

The embodiments of the present application may be applied to various systems, especially the 5G system. For example, embodiments may be applied to the global system of mobile communication (GSM), the code division multiple access (CDMA) system, the wideband code division multiple access (WCDMA) general packet radio service (GPRS) system, the long term evolution (LTE) system, the LTE frequency division duplex (FDD) system, the LTE time division duplex (TDD) system, the universal mobile telecommunication system (UMTS), the worldwide interoperability for microwave access (WiMAX) system, the 5G system, the 5G NR system, etc. Each of these various systems includes a terminal device and a network device.

The terminal device involved in the embodiments of the present application may be a device that provides voice and/or data connectivity for a user, a handheld device with a wireless connection function, or other processing devices connected to a wireless modem. The terminal device may have different names in different systems. For example, in the 5G system, the terminal device may be referred to as user equipment (UE). A wireless terminal device may communicate with one or more core networks via the wireless access network (RAN). The wireless terminal device may be a mobile terminal device, such as a mobile phone (or referred to as "cellular" phone), and a computer with a mobile terminal device. For example, the wireless terminal device may be a portable, pocket-size, handheld, computer built-in or vehicle-mounted mobile apparatus, which exchange language and/or data with the wireless access network. For example, the wireless terminal device may be personal communication service (PCS) phones, cordless phones, session initiated protocol (SIP) phones, wireless local loop (WLL) stations, personal digital assistants (PDA), and other devices. The wireless terminal device may also be referred to as a system, a subscriber unit, a subscriber station, a mobile station, a mobile, a remote station, an access point, a remote terminal, an access terminal, a user terminal, a user agent, and a user device, which is not limited in the embodiments of the present application.

The network device involved in the embodiments of the present application may be a base station, and the base station may include cells. In specific application occasions, the base station may also be referred to as an access point, or may refer to a device that communicates with the wireless terminal device via one or more sectors on an air interface in an access network, or may have other names. The network device may be configured to convert received air frames to and from internet protocol (IP) packets and act as a router between the wireless terminal device and the rest of the access network. The rest of the access network may include the internet protocol (IP) communication network. The network device may also coordinate attribute management for the air interface. For example, the network device involved in the embodiments of the present application may be a base transceiver station (BTS) in the GSM or CDMA, or a NodeB in the WCDMA, or an evolutional node B (eNB or e-NodeB) in the LTE system, a 5G base station in the next generation system, a home evolved node B (HeNB), a relay node, a femto, a pico, etc., which is not limited in the embodiments of the present application.

The embodiments of the present application will be described in detail below with reference to the accompanying drawings. It should be noted that the order of presentation of the embodiments of the present application only represents the sequence of embodiments and does not represent advantages and disadvantages of the embodiments.

Embodiments of the present application provide an adaptive PDCCH monitoring scheme, for performing adaptive adjustment on one or more pieces of information of parameter configuration of a PDCCH monitoring occasion as follows.

Function 1: an indication of whether to skip the next or subsequent PDCCH monitoring occasions.

Function 2: an indication of adaptive PDCCH monitoring of an SCell, configured to indicate which SCells or which SCell groups perform PDCCH monitoring adaptive adjustment. For example, the indication may be a bitmap of SCells or SCell groups configured by higher layer signaling, or a serial number or index value of the SCells or SCell groups configured by higher layer signaling.

Function 3: an indication of a cycle of a PDCCH monitoring occasion, namely, an optional monitoring cycle. For example, the indication may indicate a specific monitoring cycle, or an index value of a monitoring cycle, or whether to change a cycle of monitoring occasions.

Function 4: an indication of a control resource set (CORESET) where the PDCCH monitoring occasion is located, namely, an optional CORESET where the monitoring occasion is located. For example, the optional CORESET where the monitoring occasion is located may be a subset of the CORESET resource associated with a configured search space, or a CORESET resource different from a CORESET associated with the search space. The indication may be an optional CORESET index indication, or an indication of whether to change a CORESET.

Function 5: an indication of a monitoring pattern of the PDCCH monitoring occasion, namely, an optional monitoring pattern. For example, the optional monitoring pattern may be a subset of the configured monitoring pattern, or a monitoring pattern different from the configured monitoring pattern. The indication may indicate a specific monitoring pattern, or whether to change the monitoring pattern; or the indication may be an index of the optional monitoring pattern.

Function 6: an indication of PDCCH monitoring aggregation levels and/or the quantity of PDCCH candidates per aggregation level, that is, an optional aggregation level set and/or the corresponding quantity of PDCCH candidates. The optional aggregation level set and/or the corresponding quantity of PDCCH candidates may be a subset of a configured aggregation level set and/or the corresponding quantity of PDCCH candidates, or configuration values different from the configured PDCCH monitoring aggregation level and/or the quantity of PDCCH candidates per aggregation level.

Function 7: an indication of monitoring a duration of consecutive slots where a search space of a PDCCH is located, namely indicating an optional "duration". The optional "duration" here may be different duration values, or a subset of the configured "duration", or an indication of changing a "duration" value.

It should be noted that the embodiments of the present application are not limited to the PDCCH parameter configuration listed above.

A base station may configure one or more parameter configuration sets for an adaptive function of the terminal, such as {configuration 1, configuration 2, ..., configuration N}, for an adaptive indication to the terminal. Different configurations may have a subset nesting relationship, or may be mutually independent. The base station may indicate the above adaptive PDCCH function to the terminal separately or jointly, explicitly or implicitly.

Adjustments may be made in one or a combination of the following manners:

a new bit field, such as K1 (K1 is an integer greater than or equal to 0) bits, is added to existing DCI formats, such as DCI format 1_1 or DCI format 1_0;

a new bit field, such as K2 (K2 is an integer greater than or equal to 0) bits, is added to a newly introduced DCI format, such as DCI format 2_6; and an indication is performed via a media access control control element (MAC CE).

The above DCI adjustment manners are only examples, rather than a limitation.

The following is an adaptive scheme described in the embodiments of the present application. For example, when the base station configures an initial PDCCH monitoring configuration for the terminal, namely, a search space set 1, the UE may perform PDCCH monitoring according to the search space set 1. When the service state or channel condition of the UE changes, the base station may indicate the UE to change PDCCH monitoring information, such as configuration 1, via downlink signaling, such as the DCI and/or the MAC CE. When current PDCCH monitoring information does not meet the service requirements of a user, the base station may indicate the UE to change the PDCCH monitoring information, such as configuration 2, via downlink signaling, such as the DCI and/or the MAC CE, or return to the initial PDCCH monitoring configuration information.

Examples of several specific embodiments are given below.

Embodiment 1

K1 bits (K1 is an integer greater than 0) are added to existing DCI format, such as DCI format 1_1 or DCI format 1_0, to indicate a PDCCH monitoring adaptation scheme, including one or more of the following adaption functions. The following is examples of a PDCCH adaption schemes enabled.

Scheme 1: K1 is indicated in an explicit manner, for example, higher layer signaling configures the format size of DCI format 1_1 or DCI format 1_0, where K1 bits correspond to N (N is an integer greater than 0) adaptive functional domains in a segmented manner.

Each function i (0≤i≤N) corresponds to K1_i bits respectively. The K1 bits are presented in DCI format 1_1 or DCI format 1_0 as: K1={K1_1, K1_2, ..., K1_N}, corresponding to {function 1, function 2, ..., function N}, respectively.

The value of K1_i may be explicitly configured via higher layer signaling, or may be obtained by implicit derivation based on the quantity of options of the function i configured via higher layer signaling. The value of the adaptive function N may also be explicitly configured via higher layer signaling, or may be obtained by implicit derivation based on the quantity of function lists (or function-corresponding tables or bitmaps) configured via higher layer signaling.

Examples for K1_i Bits.

1), An indication of skipping the PDCCH monitoring occasion, indicating whether to skip the next or subsequent monitoring occasions. For example, K1_1=1 bit, where "0" indicates monitoring the next or subsequent PDCCH monitoring occasions, "1" indicates skipping the next or subsequent PDCCH monitoring occasions, and the quantity of skipped PDCCH monitoring occasions is configured via higher layer signaling.

2), A PDCCH monitoring adaptive indication of an SCell, indicating which SCells or which SCell groups perform PDCCH monitoring adaptive adjustment, such as 0-K bits (K is an integer greater than 0). If the UE does not support carrier aggregation, the indication of PDCCH monitoring adaptation of the SCell is 0 bit. Indication information greater than or equal to 1 bit is configured to indicate whether an SCell or an SCell group configured via higher layer signaling performs PDCCH monitoring adaptive adjustment. Each bit may correspond to one SCell/SCell group. For example, "0" indicates that the corresponding SCell/SCell group does not perform adaptive adjustment; and "1" indicates that the corresponding SCell/SCell group needs adaptive adjustment, or indicates the serial number or index value of the SCell or SCell group configured via higher layer signaling.

3), An indication of a cycle of a PDCCH monitoring occasion. For example, a), K1_2=1 bit, where "0" indicates a PDCCH monitoring cycle 1, and "1" indicates a PDCCH monitoring cycle 2; or "0" indicates not changing a PDCCH monitoring cycle, "1" indicates changing the PDCCH monitoring cycle, and a changed cycle is pre-configured via higher layer signaling. b), K1_2=2 bits, where {"00", "01", "10", "11"} correspond to PDCCH monitoring cycles 1 to 4 respectively, or correspond to PDCCH monitoring cycle indexes 1 to 4 respectively; and a specific PDCCH monitoring cycle may be configured via higher layer signaling.

4), A CORESET function of the PDCCH monitoring occasion. For example, a), K1_3=1 bit, where "0" indicates CORESET_1, and "1" indicates CORESET_2; or "0" indicates not changing a CORESET, "1" indicates changing the CORESET, and a changed CORESET is configured via higher layer signaling. b), K1_3=2 bits, where {"00", "01", "10", "11"} correspond to CORESET_1 to CORESET_4 respectively, and a specific CORESET_i may be configured via higher layer signaling. According to the provisions of NR Rel-15, the quantity of CORESETs in a cell is limited to 3, and more than 3 CORESETs here may be configured to expand the quantity of subsequent CORESETs. The adjusted CORESET resource may be a subset of the initially configured CORESET resource, or completely different CORESET resource from the initially configured CORESET resource.

5), A monitoring pattern of the PDCCH monitoring occasion. For example, a), K1_4=1 bit, where "0" indicates a PDCCH monitoring pattern 1, and "1" indicates a PDCCH monitoring pattern 2; or "0" indicates not changing a monitoring pattern, "1" indicates changing the monitoring pattern, and a changed monitoring pattern is configured via higher layer signaling. b), K1_4=2 bits, where {"00", "01", "10", "11"} correspond to PDCCH monitoring patterns 1 to 4 respectively, or correspond to index values 1 to 4 of the monitoring pattern configured via higher layer signaling respectively; and a specific PDCCH monitoring pattern may be configured via higher layer signaling.

6), An indication of a candidate PDCCH monitoring occasion aggregation level and/or the quantity of PDCCH candidates per aggregation level. For example, a), K1_5=1 bit, where "0" indicates a PDCCH monitoring aggregation level set 1 and/or the corresponding quantity of PDCCH candidates, and "1" indicates a PDCCH monitoring aggregation level set 2 and the corresponding quantity of PDCCH candidates; or, "0" indicates not changing a PDCCH monitoring aggregation level set and the corresponding quantity of PDCCH candidates, "1" indicates changing the PDCCH monitoring aggregation level set and the corresponding quantity of PDCCH candidates, and a changed PDCCH monitoring aggregation level set and the corresponding quantity of PDCCH candidates are configured via higher layer signaling. b), K1_5=2 bits, where {"00", "01", "10", "11"} correspond to the PDCCH monitoring aggregation level set 1 and the corresponding quantity of PDCCH candidates to a PDCCH monitoring aggregation level set 4 and/or the corresponding quantity of PDCCH candidates respectively, or correspond to corresponding index values configured via higher layer signaling respectively; and a specific PDCCH monitoring pattern may be configured via higher layer signaling.

Each functional domain is not limited to the above listed. The following examples illustrate enabling of one or more adaptive functions.

1), One adaptive function is enabled.

a), Only a skipping duration function of the PDCCH monitoring occasion is enabled. The parameter configuration of the PDCCH monitoring occasion initially configured by the base station for the UE is: the PDCCH search space set 1; and the UE performs PDCCH monitoring at each PDCCH monitoring occasion according to the parameter configuration of the search space set 1. When there is no data transmission for the UE during DRX active time, it is not necessary for the UE to perform PDCCH monitoring at every monitoring occasion, and the base station uses DCI format 1_1 or DCI format 1_0 to indicate the UE to skip the next PDCCH monitoring occasion; where the skipping duration indication of the PDCCH monitoring occasion="1". The UE does not perform PDCCH monitoring in the next monitoring occasion. When there is data arriving for the UE, the base station sends DCI format 1_1 or DCI format 1_0 at the monitoring occasion where the UE can perform monitoring to indicates that the UE resumes to perform PDCCH monitoring at the initially configured monitoring occasion, where the skipping duration indication of the PDCCH monitoring occasion="0".

b), Only a cycle function of the PDCCH monitoring occasion is enabled. The parameter configuration of the PDCCH monitoring occasion initially configured by the base station for the UE is: the PDCCH search space set 1; and the UE performs PDCCH monitoring according to the monitoring occasion in the parameter configuration of the search space set 1, such as 1 slot. When there is no data transmission for the UE during DRX active time, it is not necessary for the UE to perform PDCCH monitoring in every slot, and the base station uses DCI format 1_1 or DCI format 1_0 to change a PDCCH monitoring cycle to "2 slots" configured via higher layer signaling, where an indication of a cycle of the PDCCH monitoring occasion="1". After the UE receives DCI format 1_1 or DCI format 1_0, the PDCCH monitoring cycle is changed to "2 slots". When there is data arriving for the UE, the base station sends DCI format 1_1 or DCI format 1_0 at the monitoring occasion where the UE can perform monitoring to indicates that the UE resumes to perform PDCCH monitoring at the initially configured monitoring cycle, namely, PDCCH monitoring is performed at every slot, where the indication of the cycle of the PDCCH monitoring occasion="0".

c), Only a CORESET function of the PDCCH monitoring occasion is enabled. The parameter configuration of the PDCCH monitoring occasion that may be configured by the base station for the terminal is: the PDCCH search space set 1, which is associated with CORESET_1, and the base station also configures CORESET_2 or other CORESET configurations for the UE via higher layer signaling. CORESET_2 may be a subset of CORESET_1, or a resource set that has no intersection with CORESET_1. The terminal performs PDCCH monitoring on CORESET_1 associated with the PDCCH search space set 1. When there is no data transmission for the UE during DRX active time, it is not necessary for the UE to perform PDCCH monitoring on the entire CORESET_1, and the base station uses DCI format 1_1 or DCI format 1_0 to indicate the associated CORESET is changed to CORESET_2, or the CORESET is indicated to change, and PDCCH monitoring is performed via the pre-configured CORESET_2; where the CORESET function associated with the PDCCH search space set is K1_3=1 bit, and the value is "1". CORESET_2 may be a subset of CORESET_1, to save the power consumption generated by PDCCH monitoring. Or, CORESET_2 has no intersection with CORESET_1, but has the less frequency domain resource than CORESET_1, which may also save power consumption of the terminal. If there is data arriving for the UE, the base station may use DCI format 1_1 or DCI format 1_0 to indicate that CORESET_2 is resumed to CORESET_1 or to indicate CORESET_2 to be other CORESETs, where the CORESET function associated with the PDCCH search space set is K1_3=1 bit, and the value is "0".

d), Only a monitoring pattern function of the PDCCH monitoring occasion is enabled. The parameter configuration of the PDCCH monitoring occasion that may be configured by the base station for the terminal is: the PDCCH search space set 1; where a PDCCH monitoring pattern 1 is configured, that is, 3 symbols of a CORESET resource, and a first symbol of the CORESET is respectively at a first symbol and a fifth symbol in a slot. The UE initially performs PDCCH monitoring according to the search space set 1. When the current service condition of the UE changes, for example, there is no ultra-reliable low-latency communications (URLLC) service, the base station may send DCI format 1_1 or DCI format 1_0 to indicate that the PDCCH monitoring pattern is changed to a PDCCH monitoring pattern 2; where the monitoring pattern indication of the PDCCH monitoring occasion is K1_4=1 bit, and the value is "1". The PDCCH monitoring pattern 2 is configured via higher layer signaling. When the user has the URLLC service, the base station may send DCI format 1_1 or DCI format 1_0 to indicate that the PDCCH monitoring pattern is resumed to the PDCCH monitoring pattern 1; where the monitoring pattern indication of the PDCCH monitoring occasion is K1_4=1 bit, and the value is "0".

e), Only candidate PDCCH monitoring occasion aggregation levels and/or the quantity of PDCCH candidates per aggregation level are enabled. The parameter configuration of the PDCCH monitoring occasion that may be configured by the base station for the terminal is: the PDCCH search space set 1. The quantities {n1, n2, n3, n4, n5} of PDCCH candidates corresponding to different aggregation levels {1, 2, 4, 8, 16} are configured; and the quantities {k1, k2, k3} of PDCCH candidates corresponding to the candidate aggregation levels {4, 8, 16}, or the quantities {m1, m2, m3, m4, m5} of PDCCH candidates under aggregation levels {1, 2, 4, 8, 16} are configured via higher layer signaling. The UE initially performs PDCCH monitoring according to the configuration of the PDCCH search space set 1. When the channel condition of the UE is poor, or the UE does not have corresponding service transmission, the base station sends DCI format 1_1 or DCI format 1_0 to indicate that the UE performs PDCCH monitoring according to the candidate PDCCH monitoring occasion aggregation levels and/or the quantity of PDCCH candidates per aggregation level configured via higher layer signaling; where the indication of the candidate PDCCH monitoring occasion aggregation levels and/or the quantity of PDCCH candidates per aggregation level is K1_5=1 bit, and the value is "1".

f) Only the indication of monitoring the duration of consecutive slots where the search space of the PDCCH is located is enabled. The parameter configuration of the PDCCH monitoring occasion that may be configured by the base station for the terminal is: the PDCCH search space set 1; where "duration" in the search space set 1 is configured as 3. The UE performs PDCCH monitoring according to the configuration of the PDCCH search space set 1. When there is no data transmission temporarily for the UE, the base station sends DCI format 1_1 or DCI format 1_0 to indicate the UE to change the "duration" and performs PDCCH monitoring at an optional duration value or a specific monitoring position in the duration configured via higher layer signaling, where K1_6=1 bit, and the value is "1"; or, to indicate the UE to perform PDCCH monitoring according to duration=2, or according to an index 2 in the optional duration set configured via higher layer signaling, where K1_6=2 bits, and the value is "10". The above is only examples, rather than a limitation.

2), Adaptive functions are enabled.

The parameter configuration of the PDCCH monitoring occasion initially configured by the base station for the UE is: the PDCCH search space set 1. {CORESET_1, PDCCH monitoring cycle=1 slot, . . . , the quantities {n1, n2, n3, n4, n5} of PDCCH candidates corresponding to aggregation levels {1, 2, 4, 8, 16}}.

The above is only for example, and the specific parameter configuration is consistent with the definition in NR R15.

At the same time, the base station configures a PDCCH functional domain for the UE via high-layer signaling as: {candidate CORESET: CORESET_2; PDCCH monitoring cycle: 2 slots; the quantities {m1, m2, m3} of PDCCH candidates corresponding to aggregation levels {4, 8, 16}}.

The UE performs PDCCH monitoring according to the PDCCH search space set 1 when initially accessed. When there is no data transmission for the UE, the base station uses DCI format 1_1 or DCI format 1_0, with PDCCH adaptive scheme information {1 1 1}, respectively indicating changing the CORESET resource to CORESET_2, changing the PDCCH monitoring cycle to 2 slots, and changing the aggregation level and the corresponding quantity of PDCCH candidates to only performing monitoring at the aggregation levels {4, 8, 16}, where the quantities of PDCCH candidates are {m1, m2, m3}.

For K1, the higher layer signaling configures 3 bits. Since the higher layer configures three adaptive functional domains, each adaptive functional domain corresponds to 1 bit of information.

Or, for the case where the UE supports multi-cell connectivity, the base station may perform an adaptive indication together with a serving cell and an SCell/SCell group. For example, the parameter configuration of the PDCCH monitoring occasion initially configured by the base station for the UE is: the PDCCH search space set 1. {CORESET_1, PDCCH monitoring cycle=1 slot, . . . , the quantities {n1, n2, n3, n4, n5} of PDCCH candidates corresponding to aggregation levels {1, 2, 4, 8, 16}}.

In addition, SCell/SCell group information is also configured for the UE, such as: {SCell/SCell group 1, SCell/SCell group 2}, and a candidate PDCCH monitoring parameter configuration set 2 of each SCell/SCell group. For a candidate PDCCH monitoring parameter configuration set of an SCell group, parameter configurations of SCells in the group may be the same or different.

The UE performs PDCCH monitoring according to the PDCCH search space set 1 when initially accessed, and performs corresponding PDCCH monitoring for all activated SCells/SCell groups. When there is no data transmission for the UE, the base station uses DCI format 1_1 or DCI format 1_0, with PDCCH adaptive scheme information {1 0 1 1 1}, to indicate changing the CORESET resource to CORESET_2, changing the PDCCH monitoring cycle to 2 slots, and changing the aggregation level and the corresponding quantity of PDCCH candidates to only performing monitoring at the aggregation levels {4, 8, 16} respectively; where the quantities of PDCCH candidates are {m1, m2, m3}; and the PDCCH monitoring parameter of the SCell/SCell group 2 is changed and adjusted to a PDCCH monitoring parameter configuration set 2.

Or, for the case where the UE supports multi-cell connectivity, the base station may perform the adaptive indication together with the serving cell and the SCell/SCell group. For example, the parameter configuration of the PDCCH monitoring occasion initially configured by the base station for the UE is: the PDCCH search space set 1. {CORESET_1, PDCCH monitoring cycle=1 slot, . . . , the quantities {n1, n2, n3, n4, n5} of PDCCH candidates corresponding to aggregation levels {1, 2, 4, 8, 16}}.

In addition, SCell/SCell group information is also configured for the UE, such as: {SCell/SCell group 1, SCell/SCell group 2}. The indicated SCell/SCell group is consistent with PDCCH monitoring parameters adjusted by the serving cell, such as a PDCCH skip indication, a PDCCH cycle change indication, and candidate aggregation levels and corresponding quantities of PDCCH candidates.

Or, for the case where the UE supports multi-cell connectivity, the base station may perform the adaptive indication together with the serving cell and the SCell/SCell group. For example, the parameter configuration of the PDCCH monitoring occasion initially configured by the base station for the UE is: the PDCCH search space set 1. {CORESET_1, PDCCH monitoring cycle=1 slot, . . . , the quantities {n1, n2, n3, n4, n5} of PDCCH candidates corresponding to aggregation levels {1, 2, 4, 8, 16}}.

In addition, SCell/SCell group information is also configured for the UE, such as: {SCell/SCell group 1, SCell/SCell group 2}. Two BWPs are configured for each SCell, namely an initial configuration BWP and an adaptive adjustment BWP, respectively configuring initial PDCCH parameter configuration and adaptively adjusted PDCCH parameter configuration. When a bit configuration corresponding to the SCell/SCell group in the PDCCH monitoring adaption indication of the SCell is "1", BWP switch is performed on a corresponding activated SCell/SCell group, to switch the initial configuration BWP to the adaptive adjustment BWP.

Or, for the case where the UE supports multi-cell connectivity, the base station may perform the adaptive indication on the SCell/SCell group independently. For example, the parameter configuration of the PDCCH monitoring occasion initially configured by the base station for the UE is: the PDCCH search space set 1. {CORESET_1, PDCCH monitoring cycle=1 slot, . . . , the quantities {n1, n2, n3, n4, n5} of PDCCH candidates corresponding to aggregation levels {1, 2, 4, 8, 16}}.

In addition, SCell/SCell group information is also configured for the UE, such as: {SCell/SCell group 1, SCell/SCell group 2}, indicating the SCell/SCell group to perform PDCCH monitoring parameter adjustment. The parameter configuration may be indicated in a DCI format and/or via the MAC CE and/or higher layer signaling. For example, when there is no data transmission for the UE, the base station uses DCI format 1_1 or DCI format 1_0, with PDCCH adaptive scheme information {1 0 1 0 0}, to indicate the SCell/SCell group 2 to skip the next or subsequent PDCCH monitoring occasions. Specific skipped monitoring occasions may be configured via higher layer signaling.

Scheme 2: K1 is indicated in an explicit manner, for example, being configured via higher layer signaling. K1 bits correspond to joint coding of N PDCCH monitoring adaptive functions.

The K1 bits may indicate 2^(K1) combinations, respectively corresponding to N PDCCH monitoring functions. Specific examples are the following.

Example 1: The base station configures a PDCCH adaptive scheme list via higher layer signaling, and interprets the list as corresponding adaptive schemes via an indication of the K1 bits. An index i may be any integer in the range of 0-2^(K1).

| Adaptive scheme index | Function 1 | Function 2 | . . . | Function N |
|---|---|---|---|---|
| Index 1 | Configuration 1 | Configuration 1 | | Configuration 1 |
| Index 2 | Configuration 1 | Configuration 2 | | Configuration 1 |
| . . . | . . . | . . . | . . . | . . . |
| Index i | Configuration 2 | Configuration 1 | . . . | Configuration 4 |

Various configurations of each function are pre-configured via higher layer signaling. For example, when K1=2, the following configurations may be applied: {function 1 (candidate CORESET): configuration 1: CORESET_2; function 2 (PDCCH monitoring cycle): configuration 2: 2 slots; function 3 (candidate aggregation levels and quantities of corresponding PDCCH candidates): configuration 1: the quantities {m1, m2, m3} of PDCCH candidates corresponding to aggregation levels {4, 8, 16}}.

Function 4 (a PDCCH monitoring adaptive indication of an SCell): configuration 1: 0 0 1, indicating a third SCell/SCell group to perform PDCCH monitoring adaptive adjustment, where an adjusted parameter configuration may be pre-configured via higher layer signaling, and may also be associated with different BWPs.

Scheme 3: K1 is indicated in an implicit manner, or is obtained by deriving relevant information configured via higher layer signaling, for example, by deriving an information domain of the PDCCH monitoring adaptive function configured via higher layer signaling. It is derived that K1 bits of the PDCCH monitoring adaptive scheme may correspond to N adaptive functional domains in a segmented manner. For example, the higher layer configures three adaptive functional domains, and each functional domain has an option, it may be derived that K1=3. Or, the higher layer configures five adaptive functional domains, as well as the bitmap of a functional domain, such as {0 1 1 0 1}, the UE may obtain enable conditions of three adaptive functions, and then may obtain K1=3 in combination with the configuration information of the higher layer signaling. For the corresponding manner, please see the above scheme 1. The K1 bits may also correspond to the joint coding of N adaptive functional domains, for example, it is obtained by deriving an index value of the PDCCH adaptive scheme list configured via the higher layer signaling. For the corresponding manner, please see the above scheme 2, which will not be repeated here.

Embodiment 2

K1 or (M*K1) bits (K1 is an integer greater than or equal to 0) are added in a newly introduced DCI format, such as DCI format 2_6, to indicate a PDCCH monitoring adaptive scheme. Because the format size of DCI format 2_6 is semi-static, a user or a group of users may be notified of group information via DCI. Therefore, there are, but not limited to, the following two manners for performing PDCCH adaptive notification in DCI format 2_6.

Manner 1: different UEs are notified of the same PDCCH adaptive monitoring behavior. For all UEs in a non-sleep state, PDCCH monitoring adjustment is performed according to an adaptive scheme indicated by the DCI. In this way, K1 bits may be introduced into DCI format 2_6 to indicate N adaptive functions. For the specific indication manner, please see embodiment 1, which will not be repeated here.

Manner 2: a PDCCH adaptive monitoring indication is performed for different UEs respectively, that is, K1_i bits are added in a data block of UE_i to indicate the PDCCH adaptive monitoring behavior of a current user. The different users perform adaptive monitoring behavior adjustment according to the PDCCH adaptive indications in corresponding data blocks. For the specific indication manner, please see embodiment 1, which will not be repeated here.

Embodiment 3

The parameter configuration of the PDCCH monitoring occasion initially configured by the base station for the UE is: a PDCCH search space set 1. In addition, a candidate scheme set of a PDCCH adaptive function may also be pre-configured via higher layer signaling. In this case, the base station may indicate the UE to activate the PDCCH adaptive function via a MAC CE. For the specific indicating process, please see embodiment 1. The activation manners of the MAC CE may be, but not limited to, the following manners:

Manner 1: each adaptive function is activated separately, that is, indication of each function 1-K bits (K is an integer greater than or equal to 1, for example, K=2) indicates different options of corresponding functions respectively, and indicates by {indication of function 1, indication of function 2, . . . , indication of function N} respectively in the MAC CE.

Manner 2: an indication manner of Bitmap, that is, a bitmap for a PDCCH adaptive function is added in the MAC CE. Different bits indicate enabling of different functions, where "0" indicates not to enable a corresponding adaptive function, and "1" indicates to enable a corresponding adaptive function. An option to enable the adaptive function is pre-configured via higher layer signaling.

Manner 3: an index indication of an adaptive function list. The adaptive function list is pre-configured via the higher layer signaling of the base station:

| Adaptive scheme index | Function 1 | Function 2 | . . . | Function N |
|---|---|---|---|---|
| Index 1 | Configuration 1 | Configuration 1 | | Configuration 1 |
| Index 2 | Configuration 1 | Configuration 2 | | Configuration 1 |
| . . . | . . . | . . . | . . . | . . . |
| Index i | Configuration 2 | Configuration 1 | . . . | Configuration 4 |

The index indication of the adaptive function set is performed via the MAC CE.

Manner 4: a switch indication. 1 bit is added to the MAC CE to indicate a normal PDCCH monitoring behavior and an adaptive PDCCH monitoring scheme. For example, "0" indicates to perform the normal PDCCH monitoring, and "1" indicates to perform adaptive PDCCH monitoring. A specific adaptive PDCCH monitoring scheme is pre-configured via higher layer signaling.

To sum up, the scheme provided by the embodiments of the present application describe an adaptive PDCCH monitoring scheme, and a process of signaling modification and adaptive adjustment. The adaptive PDCCH monitoring process may be triggered in one or a combination of the following manners:
  the adaptive PDCCH monitoring scheme is triggered by enhancing existing DCI formats, such as DCI format 1_1 or DCI format 1_0. Enhancing DCI format 1_1 or DCI format 1_0, that is, adding a new bit field in the DCI format, such as K1 bits (K1 is an integer greater than or equal to 0), is configured to indicate the adaptive PDCCH monitoring scheme;
  the adaptive PDCCH monitoring scheme is triggered by enhancing newly introduced DCI format, such as DCI format 2_6. Enhancing newly introduced DCI format, namely adding a new bit field in DCI format 2_6, such as K2 bits (K2 is an integer greater than or equal to 0), is configured to indicate the adaptive PDCCH monitoring scheme; and
  the adaptive PDCCH monitoring scheme indication is performed via the MAC CE. The base station pre-configures candidates of the adaptive function of the PDCCH monitoring scheme via higher layer signaling, and the corresponding adaptive function is activated via the MAC CE.

The above indication manners may include indication information of one or a combination of the following adaptive functions:
  function 1: an indication of whether to skip the next or subsequent PDCCH monitoring occasions;
  function 2: a PDCCH monitoring adaptive indication of an SCell, configured to indicate the SCell or an SCell group to adjust the PDCCH monitoring scheme;

function 3: an indication of a cycle of the PDCCH monitoring occasion;

function 4: an indication of a control resource set (CORESET) where the PDCCH monitoring occasion is located;

function 5: an indication of a monitoring pattern of the PDCCH monitoring occasion;

function 6: an indication of a PDCCH monitoring aggregation level and/or the quantity of PDCCH candidates per PDCCH monitoring occasion aggregation level; and function 7: an indication of monitoring a duration of consecutive slots where a PDCCH search space is located.

The adaptive scheme indication may be a separate indication of each function, or a bitmap indication, or a switch indication, or a joint indication of functions, such as an index value of each adaptive function combination list.

For a scheme that cannot directly indicate a specific value by adding signaling, the base station needs to pre-configure a corresponding candidate scheme set for the UE, that is, the base station configures various parameter configuration sets for the terminal, such as {configuration 1, configuration 2, . . . , configuration N}, for the adaptive indication of the terminal.

The quantity of information bits added in signaling may be obtained via either an explicit indication or an implicit derivation.

According to the embodiments of the present application, by increasing existing signaling, adaptive PDCCH monitoring adjustment is achieved, to achieve flexible PDCCH monitoring actions and achieving an effect of power saving of the UE.

Figure 2:
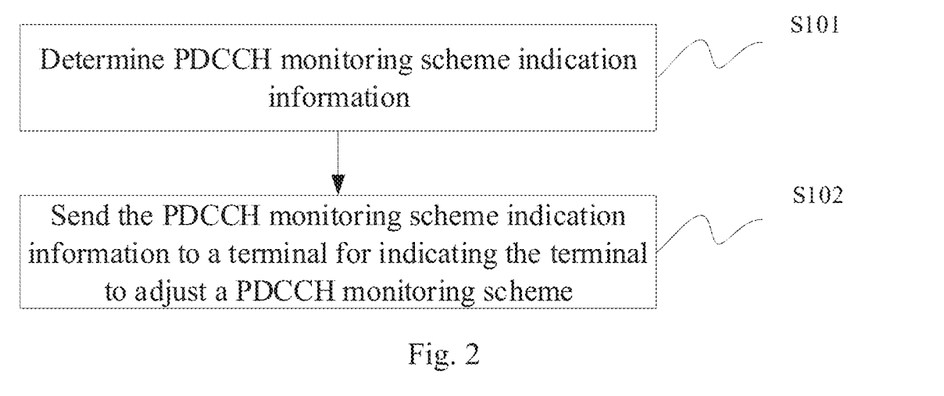
FIG. 2 is a schematic flow diagram of a channel monitoring control method on a network side provided by an embodiment of the present application.

Referring to FIG. 2, a method for controlling channel monitoring on a network side provided by an embodiment of the present application includes:

S101, determining PDCCH monitoring scheme indication information; and

S102, sending the PDCCH monitoring scheme indication information to a terminal for indicating the terminal to adjust a PDCCH monitoring scheme.

According to the embodiment of the present application, by determining the PDCCH monitoring scheme indication information, and sending the PDCCH monitoring scheme indication information to the terminal for indicating the terminal to adjust the PDCCH monitoring scheme, the adaptive PDCCH monitoring scheme is achieved, adaptive adjustment of PDCCH monitoring according to the service condition of the terminal is achieved, and the effect of power saving of the terminal is achieved.

In one embodiment, the PDCCH monitoring scheme indication information includes indication information of one or a combination of the following functions:

function 1: an indication of whether to skip the next or subsequent PDCCH monitoring occasions;

function 2: a PDCCH monitoring adaptive indication of an SCell, configured to indicate the SCell or an SCell group to adjust the PDCCH monitoring scheme;

function 3: an indication of a cycle of the PDCCH monitoring occasion;

function 4: an indication of a CORESET where the PDCCH monitoring occasion is located;

function 5: an indication of a monitoring pattern of the PDCCH monitoring occasion;

function 6: an indication of a PDCCH monitoring aggregation level and/or the quantity of PDCCH candidates per PDCCH monitoring occasion aggregation level; and function 7: an indication of monitoring a duration of consecutive slots where a PDCCH search space is located.

In one embodiment, the sending the PDCCH monitoring scheme indication information to the terminal includes: sending the PDCCH monitoring scheme indication information to the terminal via a DCI format and/or an MAC CE.

In one embodiment, the DCI format is DCI format 1_1 or DCI format 1_0 or DCI format 2_6.

In one embodiment, the sending the PDCCH monitoring scheme indication information to the terminal includes:
sending the PDCCH monitoring scheme indication information to one or more terminals.

In one embodiment, the sending the PDCCH monitoring scheme indication information to the terminal includes:
sending the PDCCH monitoring scheme indication information to the terminal in an explicit manner or an implicit manner.

Figure 3:
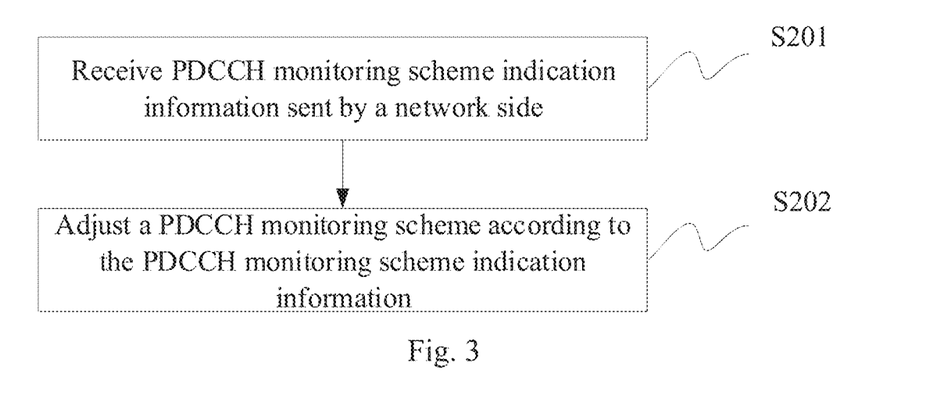
FIG. 3 is a schematic flow diagram of a channel monitoring method on a terminal side provided by an embodiment of the present application.

Referring to FIG. 3, a channel monitoring method on a terminal side provided by an embodiment of the present application includes:

S201, receiving PDCCH monitoring scheme indication information sent by a network side; and S202, adjusting a PDCCH monitoring scheme according to the PDCCH monitoring scheme indication information.

In one embodiment, the PDCCH monitoring scheme indication information includes indication information of one or a combination of the following functions:

function 1: an indication of whether to skip the next or subsequent PDCCH monitoring occasions;

function 2: a PDCCH monitoring adaptive indication of an SCell, configured to indicate the SCell or an SCell group to adjust the PDCCH monitoring scheme;

function 3: an indication of a cycle of the PDCCH monitoring occasion;

function 4: an indication of a CORESET where the PDCCH monitoring occasion is located;

function 5: an indication of a monitoring pattern of the PDCCH monitoring occasion;

function 6: an indication of a PDCCH monitoring aggregation level and/or the quantity of PDCCH candidates per PDCCH monitoring occasion aggregation level; and function 7: an indication of monitoring a duration of consecutive slots where a PDCCH search space is located.

In one embodiment, the receiving the PDCCH monitoring scheme indication information sent by the network side includes:
receiving the PDCCH monitoring scheme indication information via a DCI format and/or an MAC CE.

In one embodiment, the DCI format is DCI format 1_1 or DCI format 1_0 or DCI format 2_6.

In one embodiment, the receiving the PDCCH monitoring scheme indication information sent by the network side includes:
receiving the PDCCH monitoring scheme indication information in an explicit manner or an implicit manner.

Figure 4:
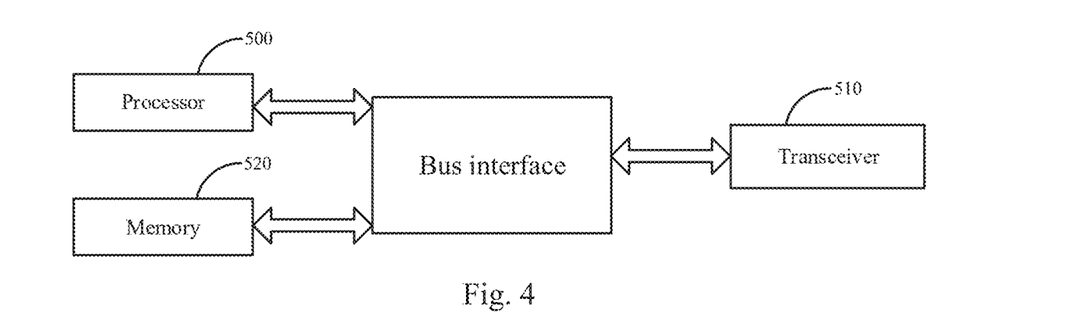
FIG. 4 is a schematic structural diagram of a channel monitoring control apparatus on a network side provided by an embodiment of the present application.

Referring to FIG. 4, an apparatus for controlling channel monitoring on a network side provided by an embodiment of the present application includes:

a processor 500, configured to read programs in a memory 520 to execute:
  determining PDCCH monitoring scheme indication information; and
  sending the PDCCH monitoring scheme indication information to a terminal via a transceiver 510 for indicating the terminal to adjust a PDCCH monitoring scheme.

In one embodiment, the PDCCH monitoring scheme indication information includes indication information of one or a combination of the following functions:
  function 1: an indication of whether to skip the next or subsequent PDCCH monitoring occasions;
  function 2: a PDCCH monitoring adaptive indication of an SCell, configured to indicate the SCell or an SCell group to adjust the PDCCH monitoring scheme;
  function 3: an indication of a cycle of the PDCCH monitoring occasion;
  function 4: an indication of a CORESET where the PDCCH monitoring occasion is located;
  function 5: an indication of a monitoring pattern of the PDCCH monitoring occasion;
  function 6: an indication of a PDCCH monitoring aggregation level and/or the quantity of PDCCH candidates per PDCCH monitoring occasion aggregation level; and
  function 7: an indication of monitoring a duration of consecutive slots where a PDCCH search space is located.

In one embodiment, the processor 500 is configured to:
send the PDCCH monitoring scheme indication information to the terminal via a DCI format and/or an MAC CE.

In one embodiment, the DCI format is DCI format 1_1 or DCI format 1_0 or DCI format 2_6.

In one embodiment, the processor 500 is configured to:
send the PDCCH monitoring scheme indication information to one or more terminals.

In one embodiment, the processor 500 is configured to:
send the PDCCH monitoring scheme indication information to the terminal in an explicit manner or an implicit manner.

The apparatus for controlling channel monitoring further includes the transceiver 510, configured to receive and send data under the control of the processor 500.

In FIG. 4, a bus architecture may include any quantity of interconnected buses and bridges, which are linked together via various circuits of one or more processors represented by the processor 500 and various circuits of memories represented by the memory 520. The bus architecture may also link various other circuits such as peripheral devices, voltage regulators, and power management circuits, which are well known in the art, and therefore are not further described herein. A bus interface provides an interface. The transceiver 510 may be elements, i.e., including a transmitter and a receiver, providing a means for communicating with various other devices over a transmission medium. The processor 500 is responsible for managing the bus architecture and general processing, and the memory 520 may store data used by the processor 500 in performing operations.

The processor 500 may be a central processing unit (CPU), an application specific integrated circuit (ASIC), a field-programmable gate array (FPGA), or a complex programmable logic device (CPLD).

Figure 5:
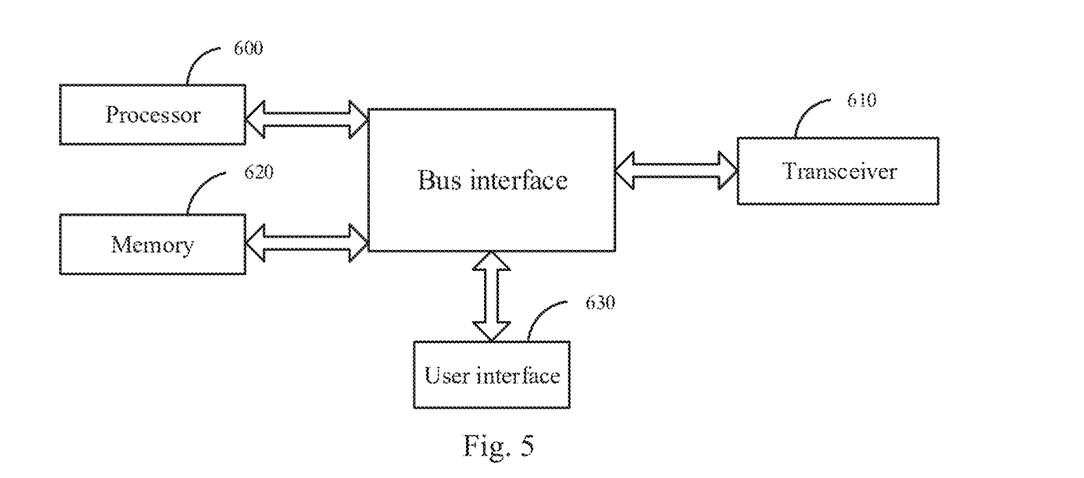
FIG. 5 is a schematic structural diagram of a channel monitoring apparatus on a terminal side provided by an embodiment of the present application.

Referring to FIG. 5, a channel monitoring apparatus on a terminal side provided by an embodiment of the present application includes:
  a processor 600, configured to read programs in a memory 620 to execute:
    receiving PDCCH monitoring scheme indication information sent by a network side via a transceiver 610; and
    adjusting a PDCCH monitoring scheme according to the PDCCH monitoring scheme indication information.

In one embodiment, the PDCCH monitoring scheme indication information includes indication information of one or a combination of the following functions:
  function 1: an indication of whether to skip the next or subsequent PDCCH monitoring occasions;
  function 2: a PDCCH monitoring adaptive indication of an SCell, configured to indicate the SCell or an SCell group to adjust the PDCCH monitoring scheme;
  function 3: an indication of a cycle of the PDCCH monitoring occasion;
  function 4: an indication of a CORESET where the PDCCH monitoring occasion is located;
  function 5: an indication of a monitoring pattern of the PDCCH monitoring occasion;
  function 6: an indication of a PDCCH monitoring aggregation level and/or the quantity of PDCCH candidates per PDCCH monitoring occasion aggregation level; and
  function 7: an indication of monitoring a duration of consecutive slots where a PDCCH search space is located.

In one embodiment, the processor 600 is configured to:
receive the PDCCH monitoring scheme indication information via a DCI format and/or an MAC CE.

In one embodiment, the DCI format is DCI format 1_1 or DCI format 1_0 or DCI format 2_6.

In one embodiment, the processor 600 is configured to:
receive the PDCCH monitoring scheme indication information in an explicit manner or an implicit manner.

The channel monitoring apparatus further includes the transceiver 610, configured to receive and send data under the control of the processor 600.

In FIG. 5, a bus architecture may include any quantity of interconnected buses and bridges, which are linked together via various circuits of one or more processors represented by the processor 600 and various circuits of memories represented by the memory 620. The bus architecture may also link various other circuits such as peripheral devices, voltage regulators, and power management circuits, which are well known in the art, and therefore are not further described herein. A bus interface provides an interface. The transceiver 610 may be elements, i.e., including a transmitter and a receiver, providing a means for communicating with various other devices over a transmission medium. For different user equipment, a user interface 630 may also be an interface configured to externally and internally connecting required devices, including but not limited to a keypad, a display, a speaker, a microphone, a joystick, and the like.

The processor 600 is responsible for managing the bus architecture and general processing, and the memory 620 may store data used by the processor 600 in performing operations.

In one embodiment, the processor 600 may be a CPU, an ASIC, an FPGA, or a CPLD.

Figure 6:
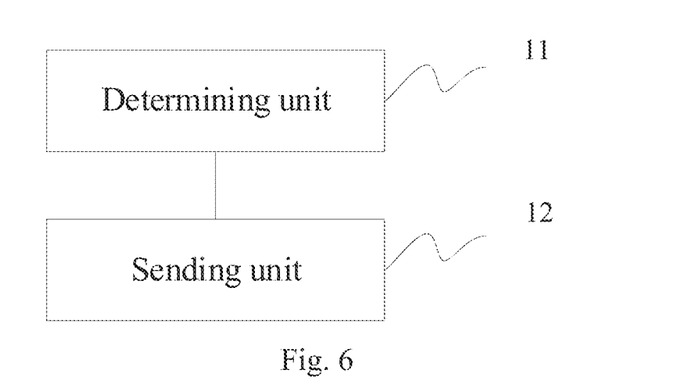
FIG. 6 is a schematic structural diagram of another channel monitoring control apparatus on a network side provided by an embodiment of the present application.

Referring to FIG. 6, another apparatus for controlling channel monitoring on a network side provided by an embodiment of the present application includes:
  a determining unit 11, configured to determine PDCCH monitoring scheme indication information; and
  a sending unit 12, configured to send the PDCCH monitoring scheme indication information to a terminal for indicating the terminal to adjust a PDCCH monitoring scheme.

In one embodiment, the PDCCH monitoring scheme indication information includes indication information of one or a combination of the following functions:
  function 1: an indication of whether to skip the next or subsequent PDCCH monitoring occasions;
  function 2: a PDCCH monitoring adaptive indication of an SCell, configured to indicate the SCell or an SCell group to adjust the PDCCH monitoring scheme;
  function 3: an indication of a cycle of the PDCCH monitoring occasion;
  function 4: an indication of a CORESET where the PDCCH monitoring occasion is located;
  function 5: an indication of a monitoring pattern of the PDCCH monitoring occasion;
  function 6: an indication of a PDCCH monitoring aggregation level and/or the quantity of PDCCH candidates per PDCCH monitoring occasion aggregation level; and
  function 7: an indication of monitoring a duration of consecutive slots where a PDCCH search space is located.

In one embodiment, the sending unit is configured to:
send the PDCCH monitoring scheme indication information to the terminal via a DCI format and/or an MAC CE.

In one embodiment, the DCI format is DCI format 1_1 or DCI format 1_0 or DCI format 2_6.

In one embodiment, the sending unit is configured to:
send the PDCCH monitoring scheme indication information to one or more terminals.

In one embodiment, the sending unit is configured to:
send the PDCCH monitoring scheme indication information to the terminal in an explicit manner or an implicit manner.

Figure 7:
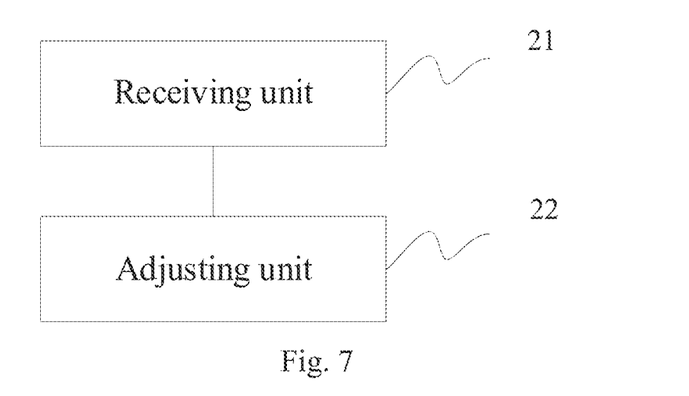
FIG. 7 is a schematic structural diagram of another channel monitoring apparatus on a terminal side provided by an embodiment of the present application.

Referring to FIG. 7, another channel monitoring apparatus on a terminal side provided by an embodiment of the present application includes:
  a receiving unit 21, configured to receive PDCCH monitoring scheme indication information sent by a network side; and
  an adjusting unit 22, configured to adjust a PDCCH monitoring scheme according to the PDCCH monitoring scheme indication information.

In one embodiment, the PDCCH monitoring scheme indication information includes indication information of one or a combination of the following functions:
  function 1: an indication of whether to skip the next or subsequent PDCCH monitoring occasions;
  function 2: a PDCCH monitoring adaptive indication of an SCell, configured to indicate the SCell or an SCell group to adjust the PDCCH monitoring scheme;
  function 3: an indication of a cycle of the PDCCH monitoring occasion;
  function 4: an indication of a CORESET where the PDCCH monitoring occasion is located;
  function 5: an indication of a monitoring pattern of the PDCCH monitoring occasion;
  function 6: an indication of a PDCCH monitoring aggregation level and/or the quantity of PDCCH candidates per PDCCH monitoring occasion aggregation level; and
  function 7: an indication of monitoring a duration of consecutive slots where a PDCCH search space is located.

In one embodiment, the receiving unit is configured to:
receive the PDCCH monitoring scheme indication information via a DCI format and/or an MAC CE.

In one embodiment, the DCI format is DCI format 1_1 or DCI format 1_0 or DCI format 2_6.

In one embodiment, the receiving unit is configured to:
receive the PDCCH monitoring scheme indication information in an explicit manner or an implicit manner.

It should be noted that the division of units in the embodiments of the present application is illustrative, and is only a logical function division, and other division manners may be used in actual implementation. In addition, each functional unit in each embodiment of the present application may be integrated into one processing unit, or each unit may exist physically alone, or two or more units may be integrated into one unit. The above integrated units may be implemented in the form of hardware, or software functional units.

If the integrated units are implemented in the form of software functional units and are sold or used as independent products, the units may be stored in a computer readable storage medium. Based on the understandings, the embodiments of the present application is essentially or the part that contributes to the prior art or the whole or part of the embodiments may be embodied in the form of a software product. The computer software product is stored in a storage medium and includes instructions configured to enable a computer device (which may be a personal computer, a server, a network device, etc.) or a processor to execute all or part of the steps of the method according to the embodiments of the present application. The above storage medium includes: a USB flash disk, a mobile hard disk, a read-only memory (ROM), a random access memory (RAM), a disk, or an optical disk or other media configured to store program codes.

An embodiment of the present application provides a computing device. The computing device may be a desktop computer, a portable computer, a smart phone, a tablet computer, a personal digital assistant (PDA), etc. The computing device may include a CPU, a memory, an input/output device, etc. The input device may include a keyboard, a mouse, a touch panel, etc. The output device may include a display device, such as a liquid crystal display (LCD), a cathode ray tube (CRT), etc.

The memory may include a ROM and a (RAM and provide a processor with program instructions and data stored in the memory. In the embodiments of the present application, the memory may be configured to store programs of any one of the methods provided by the embodiments of the present application.

The processor is configured to call the program instructions stored in the memory, and execute any one of the methods provided by the embodiments of the present application according to the obtained program instructions. An embodiment of the present application provides a computer storage medium for storing computer program instructions used for the above apparatus provided by the embodiments of the present application. The computer program instructions include programs configured to execute any one of the above methods provided by the embodiments of the present application.

The computer storage medium may be any available medium that may be accessed by a computer, or a data storage device, including, but not limited to, a magnetic memory (such as a floppy disk, a hard disk, a magnetic tape, and a magneto-optical disk (MO)), an optical memory (such as a CD, a DVD, a BD, and an HVD), a semiconductor memory (such as a ROM, an EPROM, an EEPROM, a non-volatile memory (NAND FLASH), and a solid-state disk (SSD)), etc.

The methods provided by the embodiments of the present application may be applied to a terminal device or a network device.

The terminal device may also be referred to as the UE, MS, mobile terminal, etc. In one embodiment, the terminal may have the capacity to communicate with one or more core networks via the RAN. For example, the terminal may be a mobile phone (or a "cellular" phone), or a computer with a mobile nature, etc. For example, the terminal may also be a portable, pocket-sized, handheld, computer-built, or vehicle-mounted mobile apparatus.

The network device may be a base station (for example, an access point), and refer to a device in an access network that communicates with a wireless terminal via one or more sectors on an air interface. The base station may be configured to convert received air frames to and from IP packets and act as a router between the wireless terminal and the rest of the access network. The rest of the access network may include the IP network. The base station may also coordinate attribute management for the air interface. For example, the base station may be a BTS in GSM or CDMA, or a NodeB in WCDMA, or an evolutional Node B (NodeB or eNB or e-NodeB) in LTE, or a gNB in the 5G system, which is not limited in the embodiments of the present application.

The processing flow of the above method may be implemented by a software program, and the software program may be stored in a storage medium. When the stored software program is called, the steps of the above method are executed.

The embodiments of the present application may be provided as methods, systems, or computer program products. Therefore, the present application may take the form of a full hardware embodiment, a full software embodiment, or an embodiment combining software and hardware. Besides, the present application may adopt the form of a computer program product implemented on one or more computer available storage media (including but not limited to a disk memory, an optical memory and the like) containing computer available program codes.

The present application is described with reference to the flow diagram and/or block diagram of the method, device (system), and computer program product according to the embodiments of the present application. It should be understood that each flow and/or block in the flow diagram and/or block diagram and the combination of flows and/or blocks in the flow diagram and/or block diagram can be implemented by computer program instructions. These computer program instructions can be provided to processors of a general-purpose computer, a special-purpose computer, an embedded processor or other programmable data processing devices to generate a machine, and instructions executed by processors of a computer or other programmable data processing devices generate an apparatus for implementing the functions specified in one or more flows of the flow diagram and/or one or more blocks of the block diagram.

These computer program instructions can also be stored in a computer-readable memory configured to guide a computer or other programmable data processing devices to work in a specific manner, and instructions stored in the computer-readable memory generate a manufacturing product including an instruction apparatus, and the instruction apparatus implements the functions specified in one or more flows of the flow diagram and/or one or more blocks of the block diagram.

These computer program instructions can also be loaded on a computer or other programmable data processing devices, and a series of operation steps are executed on the computer or other programmable devices to produce computer-implemented processing, and thus, the instructions executed on the computer or other programmable devices provide steps for implementing the functions specified in one or more flows of the flow diagram and/or one or more blocks of the block diagram.

What is claimed is:

1. A method for controlling channel monitoring, comprising:
    determining physical downlink control channel (PDCCH) monitoring scheme indication information; and
    sending the PDCCH monitoring scheme indication information to one or more terminals for indicating the one or more terminals to adjust a PDCCH monitoring scheme, via adding a new bit field to a downlink control information (DCI) format;
    wherein the PDCCH monitoring scheme indication information comprises indication information of a combination of following functions:
    function 1: an indication of whether to skip a next or a plurality of subsequent PDCCH monitoring occasions;
    function 3: an indication of a cycle of a PDCCH monitoring occasion;
    function 4: an indication of a control resource set (CORESET) where a PDCCH monitoring occasion is located;
    function 5: an indication of a monitoring pattern of a PDCCH monitoring occasion;
    function 6: an indication of a PDCCH monitoring aggregation level and/or a quantity of PDCCH candidates per PDCCH monitoring occasion aggregation level; and
    function 7: an indication of monitoring a duration of consecutive slots where a PDCCH search space is located;
    wherein the DCI format is DCI format 1_1 or DCI format 1_0 or DCI format 2_6; and the new bit field corresponds to joint coding of the function 1 and the function 3 to the function 7.

2. The method according to claim 1, wherein the sending the PDCCH monitoring scheme indication information to the one or more terminals comprises:
    sending the PDCCH monitoring scheme indication information to the one or more terminals via the DCI format and/or a medium access control control element (MAC CE).

3. The method according to claim 1, wherein the sending the PDCCH monitoring scheme indication information to the one or more terminals comprises:
    sending the PDCCH monitoring scheme indication information to the one or more terminals in an explicit manner or an implicit manner.

4. A channel monitoring method, comprising:
    receiving physical downlink control channel (PDCCH) monitoring scheme indication information sent by a network side via a new bit field added to a downlink control information (DCI) format; and
    adjusting a PDCCH monitoring scheme according to the PDCCH monitoring scheme indication information;
    wherein the PDCCH monitoring scheme indication information comprises indication information of a combination of following functions:
    function 1: an indication of whether to skip a next or a plurality of subsequent PDCCH monitoring occasions;
    function 3: an indication of a cycle of a PDCCH monitoring occasion;
    function 4: an indication of a control resource set (CORESET) where a PDCCH monitoring occasion is located;

function 5: an indication of a monitoring pattern of a PDCCH monitoring occasion;
function 6: an indication of a PDCCH monitoring aggregation level and/or a quantity of PDCCH candidates per PDCCH monitoring occasion aggregation level; and
function 7: an indication of monitoring a duration of consecutive slots where a PDCCH search space is located;
wherein the DCI format is DCI format 1_1 or DCI format 1_0 or DCI format 2_6; and the new bit field corresponds to joint coding of the function 1 and the function 3 to the function 7.

5. The method according to claim 4, wherein the receiving the PDCCH monitoring scheme indication information sent by the network side comprises:
receiving the PDCCH monitoring scheme indication information via the DCI format and/or a medium access control control element (MAC CE).

6. The method according to claim 4, wherein the receiving the PDCCH monitoring scheme indication information sent by the network side comprises:
receiving the PDCCH monitoring scheme indication information in an explicit manner or an implicit manner.

7. An apparatus for controlling channel monitoring, comprising:
a memory, configured to store program instructions; and
a processor, configured to call the program instructions stored in the memory, and execute the method of claim 1.

8. The apparatus according to claim 7, wherein the processor is configured to:
send the PDCCH monitoring scheme indication information to the one or more terminals via a downlink control information (DCI) format and/or a medium access control control element (MAC CE).

9. The apparatus according to claim 7, wherein the processor is configured to:
send the PDCCH monitoring scheme indication information to the one or more terminals in an explicit manner or an implicit manner.

10. A channel monitoring apparatus, comprising:
a memory, configured to store program instructions; and
a processor, configured to call the program instructions stored in the memory, and execute according to an obtained program:
receiving physical downlink control channel (PDCCH) monitoring scheme indication information sent by a network side via a new bit field added to a downlink control information (DCI) format; and
adjusting a PDCCH monitoring scheme according to the PDCCH monitoring scheme indication information;
wherein the PDCCH monitoring scheme indication information comprises indication information of a combination of following functions:
function 1: an indication of whether to skip a next or a plurality of subsequent PDCCH monitoring occasions;
function 3: an indication of a cycle of a PDCCH monitoring occasion;
function 4: an indication of a control resource set (CORESET) where a PDCCH monitoring occasion is located;
function 5: an indication of a monitoring pattern of a PDCCH monitoring occasion;
function 6: an indication of a PDCCH monitoring aggregation level and/or a quantity of PDCCH candidates per PDCCH monitoring occasion aggregation level; and
function 7: an indication of monitoring a duration of consecutive slots where a PDCCH search space is located;
wherein the DCI format is DCI format 1_1 or DCI format 1_0 or DCI format 2_6; and the new bit field corresponds to joint coding of the function 1 and the function 3 to the function 7.

11. The apparatus according to claim 10, wherein the processor is configured to:
receive the PDCCH monitoring scheme indication information via a downlink control information (DCI) format and/or a medium access control control element (MAC CE).

12. The apparatus according to claim 10, wherein the processor is configured to:
receive the PDCCH monitoring scheme indication information in an explicit manner or an implicit manner.

* * * * *